(12) United States Patent
Rector et al.

(10) Patent No.: US 10,640,240 B2
(45) Date of Patent: May 5, 2020

(54) THERMAL MANAGEMENT SYSTEM WITH SUBLIMATOR AND ADSORBENT BED

(71) Applicant: Hamilton Sundstrand Corporation, Charlotte, NC (US)

(72) Inventors: Tony Rector, East Granby, CT (US); Barbara M. Peyton, Windsor, CT (US); John W. Steele, New Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 155 days.

(21) Appl. No.: 15/630,278

(22) Filed: Jun. 22, 2017

(65) Prior Publication Data

US 2018/0370662 A1 Dec. 27, 2018

(51) Int. Cl.
| | |
|---|---|
| *B64G 6/00* | (2006.01) |
| *B64G 1/50* | (2006.01) |
| *C02F 1/28* | (2006.01) |
| *B01J 20/20* | (2006.01) |
| *B64G 4/00* | (2006.01) |
| *F28D 15/00* | (2006.01) |

(Continued)

(52) U.S. Cl.
CPC ............... *B64G 6/00* (2013.01); *B01J 20/20* (2013.01); *B64G 4/00* (2013.01); *C02F 1/283* (2013.01); *B01J 2220/4806* (2013.01); *B01J 2220/4812* (2013.01); *B01J 2220/56* (2013.01); *C02F 2101/34* (2013.01); *C02F 2101/40* (2013.01); *C02F 2103/023* (2013.01); *C02F 2303/22* (2013.01); *F28D 15/00* (2013.01)

(58) Field of Classification Search
CPC ... B64G 1/46; B64G 1/50; B64G 4/00; B64G 6/00; F25D 7/00; F25D 2400/26; F28D 15/00; B01J 20/20; B01J 47/06; B01J 2220/4806; B01J 2220/42; B01J 2220/56; B01J 2220/4812; C02F 1/281; C02F 1/283; C02F 2101/34; C02F 2101/40; C02F 2103/023; C02F 2303/22; C11D 3/184; C11D 3/3409
See application file for complete search history.

(56) References Cited

U.S. PATENT DOCUMENTS

| | | |
|---|---|---|
| 3,212,286 A | 10/1965 | Curtis |
| 5,943,931 A | 8/1999 | Stumpf et al. |

(Continued)

OTHER PUBLICATIONS

Juang et al, Removal of Sodium odecyl benzene sulfonate and phenol from water by a combined PAC adsorption and cross-flow microfiltration process, Jan. 2004, Journal of Chemicla Technlology and Biotechnology, vol. 79, pp. 240-246. (Year: 2004).*

(Continued)

*Primary Examiner* — Matthew O Savage
(74) *Attorney, Agent, or Firm* — Carlson, Gaskey & Olds, P.C.

(57) ABSTRACT

A thermal management system includes a sublimator that has a porous plate, a water feed line connected with the sublimator for delivering feed water to the porous plate, and an adsorbent bed in the water feed line. The sublimator is operable to freeze and sublime the feed water using the porous plate. The adsorbent bed is configured to substantially remove organic compounds from the feed water.

17 Claims, 2 Drawing Sheets

(51) Int. Cl.
*C02F 101/34* (2006.01)
*C02F 103/02* (2006.01)

(56) References Cited

U.S. PATENT DOCUMENTS

| | | | | |
|---|---|---|---|---|
| 2013/0306195 A1* | 11/2013 | Steele | ................ | C23C 8/12 |
| | | | | 148/276 |
| 2016/0083851 A1 | 3/2016 | Steele et al. | | |
| 2017/0121186 A1* | 5/2017 | Fichtner | ................ | C02F 1/283 |
| 2018/0370820 A1* | 12/2018 | Beaudry | ................ | C02F 1/50 |

OTHER PUBLICATIONS

NASA, Ambersorb 4652 Is Activated Carbon Replacement, Aug. 2015 [Retrieved from the Internet on Mar. 22, 2019] <http://www.cbd-net.com/index.php/search/show/20654021>. (Year: 2015).*

Shaheen et al, Removal of Heavy Metals from Aqueous Solution by Zeolite in Competitive Sorption System, Aug. 2012, International Journal of Environmental Science and Development, vol. 3, No. 4. (Year: 2012).*

Steele, J.W., Etter, D., and Rector, T., Boyle, R., and Vandezande, C. (2012). Efforts to reduce International Space Station crew maintenance for the management of the extravehicular mobility unit transport loop water quality. Conference Paper. 43rd International Conference on Environmental Systems; Jul. 14-18, 2013; Vail, CO; United States pp. 1-15.

Steele, J., et al., Redesign of the Extravehicular Mobility Unit Airlock Cooling Loop Recovery Assembly, 46th International Conference on Environmental Systems, Jul. 10, 2016, pp. 1-19.

Rector, T., et al., An Evaluation of Technology to Remove Problematic Organic Compounds from the International Space Station Potable Water, 44th International Conference on Environmental Systems Paper Number, Jul. 13, 2014, pp. 1-15.

Steele, J.W., Etter, D., Rector, T., Boyle, R., and Vandezande, C. (2014). Efforts to reduce International Space Station crew maintenance for the management of the extravehicular mobility unit transport loop water quality. Retrieved from: https://ntrs.nasa.gov/search.jsp?R=20130011190 2019-01-04T16:04:22+00:00Z.

Chapman, A., A Fundamental Study of Sublimation Through a Porous Surface, Jun. 30, 1971, Houston, TX, United States.

Extended European Search Report for EP Application No. 18179226.8 completed Oct. 30, 2018.

John W. Steele, "Management of the Post-Shuttle Extravehicular Mobility Unit (EMU) Water Circuits", Jan. 1, 2012, https://ntrs.nasa.gov/search.jsp?R=20120003778.

* cited by examiner

THERMAL MANAGEMENT SYSTEM WITH SUBLIMATOR AND ADSORBENT BED

BACKGROUND

A sublimator is a primary cooling device for the Extravehicular Mobility Unit (EMU) spacesuit. The sublimator includes a metallic porous plate that is exposed to space vacuum on one side. It is supplied with expendable feed water on the other side. The feed water freezes on the porous plate surface. The vacuum side progressively sublimes the ice to the vacuum of space to remove waste heat from the astronaut that is introduced into the plate.

The feed water may contain trace organic compound contaminants, typically from wetted non-metallic materials in the feed water loop (primarily amphipathic long-chain organic acids, fatty acids and surfactants with carboxylate functional groups) that can deposit on the metallic plate. Such a deposit may be in the form of an adherent molecular monolayer. This monolayer can impede sublimation and, therefore, debit sublimator performance.

The organic compounds may include processing aids, as exemplified by abietic acid, from EMU Neoprene Latex feed-water bladders, sodium dodecyl benzene sulfonate (a candidate soap for International Space Station-ISS processed water), acrylic acid oligomers from the ISS Water Processor multi-filtration bed sorbents, or other amphipathic compounds.

It is believed that the hydrophilic "heads" of the amphipathic compounds anchor or adhere to available cationic charge on the metallic surface of the porous plate, and that the hydrophobic "tails" of the amphipathic molecules form an intertwined monolayer. This phenomenon does not occur with non-volatile contaminants, such as corrosion products, iodine and biofilm, which do not have the structural features of an amphipathic compound. These non-amphipathic contaminants readily dislodge from the effluent side of the porous plate during the sublimation process and have minimal effect on performance.

SUMMARY

A thermal management system according to an example of the present disclosure includes a sublimator having a porous plate. A water feed line is connected with the sublimator for delivering feed water to the porous plate. The sublimator is operable to freeze and sublime the feed water using the porous plate. An adsorbent bed in the water feed line is configured to substantially remove organic compounds from the feed water that are capable of forming an adherent layer on the porous plate.

In a further embodiment of any of the foregoing embodiments, the organic compounds include one or more of abietic acid, sodium dodecyl benzene sulfonate (SDBS), acrylic acid oligomers, or n-butyl benzene sulfonamide (NBBS).

In a further embodiment of any of the foregoing embodiments, the adsorbent bed includes first and second adsorbent media, and the first and second adsorbent media are different with regard to adsorption capability of at least two of abietic acid, sodium dodecyl benzene sulfonate (SDBS), acrylic acid oligomers, or n-butyl benzene sulfonamide (NBBS).

In a further embodiment of any of the foregoing embodiments, the adsorbent bed includes, by volume of a total amount of the first and second adsorbent media, from 40% to 60% of the first adsorbent media and from 60% to 40% of the second adsorbent media.

In a further embodiment of any of the foregoing embodiments, the first and second adsorbent media are independently selected form the group consisting of activated carbon, zeolites, and combinations thereof.

In a further embodiment of any of the foregoing embodiments, the first adsorbent media is synthetic activated carbon and the second adsorbent media is natural activated carbon.

In a further embodiment of any of the foregoing embodiments, the adsorbent bed includes an influent side and an effluent side with regard to the delivery of the feed water to the sublimator. The first adsorbent media is on the influent side and the second adsorbent media is on the effluent side.

In a further embodiment of any of the foregoing embodiments, the sublimator is in a spacesuit.

A thermal management system according to an example of the present disclosure includes a space structure that has a heat source connected with a fluid loop for conveying a working fluid through the heat source to regulate temperature and a sublimator connected with the fluid loop to receive the working fluid. The sublimator has a porous plate. A water feed line is connected with the sublimator for delivering feed water to the porous plate. The sublimator is operable to cool the working fluid by freezing and subliming the feed water using the porous plate. An adsorbent bed in the water feed line is configured to substantially remove organic compounds from the feed water that are capable of forming an adherent layer on the porous plate.

In a further embodiment of any of the foregoing embodiments, the organic compounds include one or more of abietic acid, sodium dodecyl benzene sulfonate (SDBS), acrylic acid oligomers, or n-butyl benzene sulfonamide (NBBS).

In a further embodiment of any of the foregoing embodiments, the adsorbent bed includes first and second adsorbent media, and the first and second adsorbent media are different with regard to adsorption capability of at least two of abietic acid, sodium dodecyl benzene sulfonate (SDBS), acrylic acid oligomers, or n-butyl benzene sulfonamide (NBBS).

In a further embodiment of any of the foregoing embodiments, the adsorbent bed includes, by volume of a total amount of the first and second adsorbent media, from 40% to 60% of the first adsorbent media and from 60% to 40% of the second adsorbent media.

In a further embodiment of any of the foregoing embodiments, the first and second adsorbent media are independently selected from the group consisting of activated carbon, zeolites, and combinations thereof.

In a further embodiment of any of the foregoing embodiments, the first adsorbent media is synthetic activated carbon and the second adsorbent media is natural activated carbon.

In a further embodiment of any of the foregoing embodiments, the adsorbent bed includes an influent side and an effluent side with regard to the delivery of the feed water to the sublimator. The first adsorbent media is on the influent side and the second adsorbent media is on the effluent side.

In a further embodiment of any of the foregoing embodiments, the space structure is a spacesuit.

A thermal management system according to an example of the present disclosure includes a spacesuit that has a garment connected with a water loop for conveying coolant water through the garment to regulate temperature and a sublimator connected with the water loop to receive the coolant water. The sublimator has a porous plate. A water feed line is connected with the sublimator for delivering feed water to the porous plate. The sublimator is operable to cool the coolant water by freezing and subliming the feed water using the porous plate. An adsorbent bed in the water feed line is configured to substantially remove organic compounds from the feed water that are capable of forming an adherent layer on the porous plate.

In a further embodiment of any of the foregoing embodiments, the adsorbent bed includes first and second adsorbent media. The first and second adsorbent media are different with regard to adsorption capability of at least two of abietic acid, sodium dodecyl benzene sulfonate (SDBS), acrylic acid oligomers, or n-butyl benzene sulfonamide (NBBS), and the adsorbent bed includes, by volume of a total amount of the first and second adsorbent media, from 40% to 60% of the first adsorbent media and from 60% to 40% of the second adsorbent media.

In a further embodiment of any of the foregoing embodiments, the first adsorbent media is synthetic activated carbon and the second adsorbent media is natural activated carbon.

In a further embodiment of any of the foregoing embodiments, the adsorbent bed includes an influent side and an effluent side with regard to the delivery of the feed water to the sublimator. The first adsorbent media is on the influent side and the second adsorbent media is on the effluent side.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
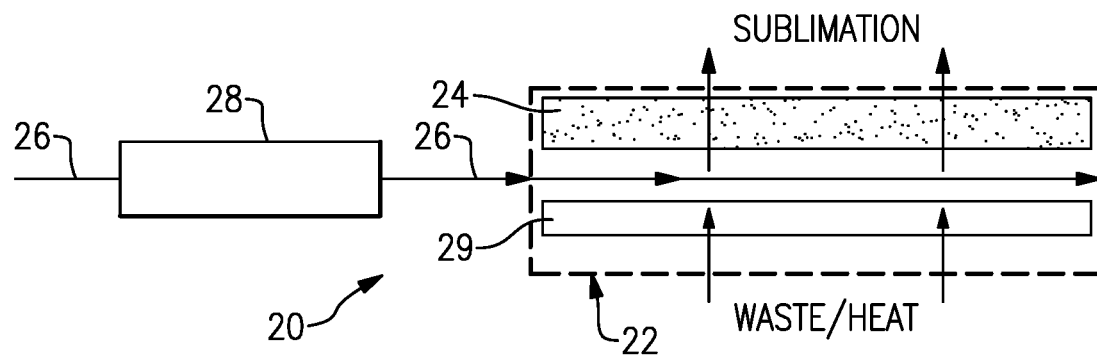
FIG. 1 illustrates an example thermal management system that has a sublimator and an adsorbent bed.

FIG. 1 schematically illustrates an example of a thermal management system 20 ("system 20"). As will be described, the system 20 includes features for removing organic compound contaminants from feed water used in the system 20—compounds which could otherwise form an adherent layer on a key component and impede performance of the system 20.

The system 20 includes a sublimator 22 that has a porous (metal) plate 24, a water feed line 26, and an adsorbent bed 28. The water feed line 26 is connected with the sublimator 22 for delivering feed water to the porous plate 24, or at least to the immediate vicinity of the porous plate 24. The adsorbent bed 28 is disposed in the water feed line 26 upstream of the sublimator 22 with regard to the direction of water flow.

The porous plate 24 is exposed on one side to a vacuum, which in most implementations is the vacuum of outer space. The sublimator 22 is operable via the porous plate 24 to freeze and sublime the feed water to the vacuum. Waste heat is introduced into the sublimator 22 through a heat conduction member or plate 29 and is removed via the sublimation process.

The feed water is fed to the sublimator 22 through the adsorbent bed 28 in the water feed line 26. The adsorbent bed 28 is configured to substantially remove target organic compounds from the feed water that are capable of forming an adherent layer on the porous plate. For example, "substantial removal" is a reduction of at least one of the target organic compounds, or even more desirably of multiple target organic compounds, by at least 50% in a single pass. In one further example, "substantial removal" presumes a maximum total organic carbon of 2 parts-per-million in the influent water and a reduction of the total organic carbon by 75% or more to 0-0.5 parts-per-million. The target organic compounds are those that are capable of forming an adherent layer on the porous plate 24. As examples, the target organic compounds are one or more of abietic acid, sodium dodecyl benzene sulfonate (SDBS), acrylic acid oligomers, or n-butyl benzene sulfonamide (NBBS).

Figure 2:
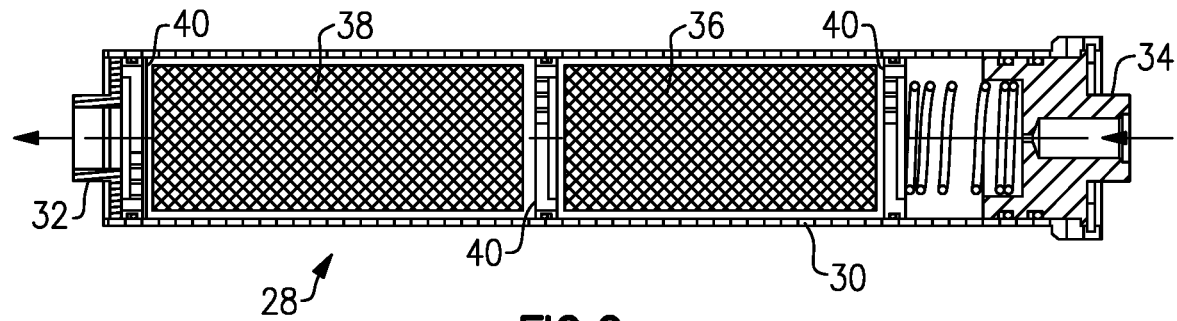
FIG. 2 illustrates an example adsorbent bed.

FIG. 2 illustrates an example of the adsorbent bed 28. The adsorbent bed 28 includes a housing 30 that defines an inlet or influent side 32 and an outlet or effluent side 34. The influent and effluent sides 32/34 designate the structure of the inlet and outlet, respectively, but these terms are also used to refer to the ends of the adsorbent bed 28 through which the water enters and exits the adsorbent bed 28. In this example, the adsorbent bed 28 includes first and second adsorbent media 36/38. The adsorbent media 36/38 may be retained in the housing 30 via screens 40, with a biasing member (e.g., a spring) facilitating retention and compaction of the adsorbent media 36/38.

The first and second adsorbent media 36/38 are different with regard to adsorption capability of the target organic compounds that can form an adherent layer and impede sublimation. For instance, the first and second adsorbent media 36/38 are different with regard to adsorption capability of at least two of abietic acid, sodium dodecyl benzene sulfonate (SDBS), acrylic acid oligomers, or n-butyl benzene sulfonamide (NBBS). In other words, the first adsorbent media 36 may be superior for removing compound A but poor for removing compound B, and the second adsorbent media 38 may be superior for removing compound B but poor for removing compound A. In this manner, the adsorbent media 36/38 are complimentary. Adsorption capability may be measured by the amount of a particular contaminant removed by a preset amount of media under a preset flow rate over the media for a preset amount of time. A Total Organic Carbon Monitor device may be used to provide a sum of all organics in the water. Gas Chromatography-Mass Spectrometry may be used to identify specific organic compounds. As will be appreciated, the adsorbent bed 28 may alternatively include only one type of adsorbent media if there is a single organic compound of interest or if the adsorbent media has good adsorption capability for the organic compounds of interest.

In one example, the first and second adsorbent media 36/38 are activated carbon (also known as activated charcoal) that are capable of substantially removing the target organic compounds, such as those listed above, that are capable of forming an adherent layer on the porous plate 24. For instance the first adsorbent media 36 is a synthetic activated carbon and the second adsorbent media 38 is a natural activated carbon. Synthetic activated carbon is typically formed by controlled pyrolysis of a polymer precursor. Natural activated carbon is typically formed by controlled pyrolysis of naturally occurring materials, such as coal, lignite, nutshells, and flour. Alternative adsorbents may be or may include zeolites, which are microporous aluminosilicate materials.

One example of the synthetic activated carbon that is capable of substantially removing the target organic compounds has pore size of less than two nanometers, a specific surface area of 1400 $m^2/g \pm 10\%$, a mean grain size of 600 micrometers±10%, ash content by weight of 0.4%, and an apparent density of 0.4 $g/cm^3 \pm 10\%$. One further example of the synthetic activated carbon is AMBERSORB® 4652 (trademark registered to Rohm and Haas Company). The physical characteristics of grade 4652 are hereby incorporated by reference.

One example natural activated carbon that is capable of substantially removing the target organic compounds is formed from steam activation of coal, a specific surface area of 1150 m$^2$/g±10%, a grain size of +8 mesh/−30 mesh, ash content by weight of 8%, and an apparent density of 0.49 g/cm$^3$±0.03. Further examples of the natural activated carbon are NORIT® Darco 8×30 and NORIT® Darco 20×40 (trademark registered to Norit International N.V.). The physical characteristics of grades Darco 8×30 and 20×40 are hereby incorporated by reference.

Table I below shows relative reductions in the target organic compounds acrylic acid oligomers, abietic acid, NBBS, and SDBS for four adsorbents, including the 4652, Darco 8×30, and Darco 20×40 from above. For comparison, Table I also lists the fourth adsorbent, NORIT® Darco RB40. NORIT® Darco RB40 is also an activated carbon but exhibits lower or poor reduction, demonstrating that activated carbons can have widely varying adsorption capability for target organic compounds.

TABLE I

Relative Reductions of Adsorbents

| Adsorbent | Acrylic Acid | Abietic Acid | NBBS | SDBS |
|---|---|---|---|---|
| AMBERSORB® 4652 | ~10% Reduction | ~85% Reduction | ~100% Reduction | ~85% Reduction |
| NORIT® Darco 8x30 | ~44% Reduction | ~74% Reduction | ~75% Reduction | ~70% Reduction |
| NORIT® Darco 20x40 | ~27% Reduction | ~84% Reduction | ~90% Reduction | ~63% Reduction |
| NORIT® Darco RB40 | ~11% Reduction | ~26% Reduction | Poor | Poor |

In another example, the adsorbent bed 28 includes, by volume of a total amount of the first and second adsorbent media 36/38, from 40% to 60% of the first adsorbent media 36 and from 60% to 40% of the second adsorbent media 38. For instance, the adsorbent bed 28 may include 40%, 45%, 50%, 55% or 60% of the first adsorbent media 36 and, respectively, 60%, 55%, 50%, 45%, or 40% of the second adsorbent media 38.

In another example, the adsorbent media 36/38 is synergistically arranged in the adsorbent bed 28 with respect to flow through the adsorbent bed 28. For instance, it was found that the second adsorbent media 38 (natural activated carbon) is superior for adsorbing acrylic acid oligomers. Adsorption of other organic compounds may reduce capability of the second adsorbent media 38 for adsorbing acrylic acid oligomers. To preserve the adsorption capacity of the second adsorbent media 38 for acrylic acid oligomers, the first adsorbent media 36 (synthetic activated carbon) is located on the influent side 32 and the second adsorbent media 38 (natural activated carbon) is on the effluent side 34. The first adsorbent media 36 removes sodium dodecyl benzene sulfonate (SDBS) and n-butyl benzene sulfonamide (NBBS), which could otherwise diminish capacity of the second adsorbent media 38 for adsorbing the acrylic acid oligomers. In this manner, the first adsorbent media 36 buffers the second adsorbent media to preserve adsorption capacity for the acrylic acid oligomers.

Figure 3:
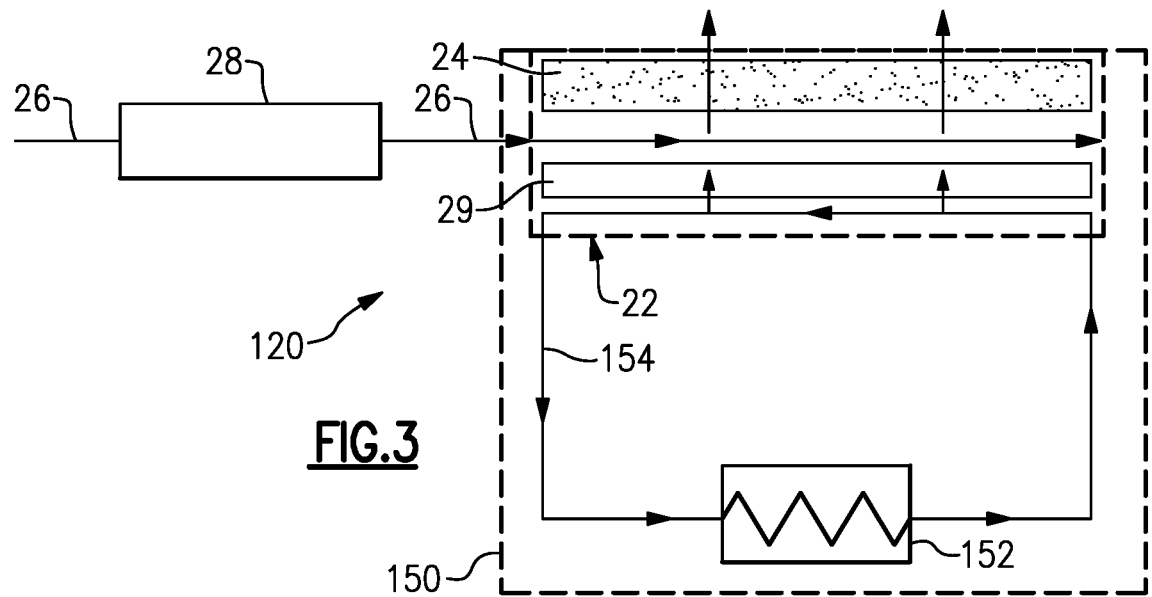
FIG. 3 illustrates another example thermal management system that involves a space structure that has a heat source.

FIG. 3 illustrates another example thermal management system 120. In this disclosure, like reference numerals designate like elements where appropriate and reference numerals with the addition of one-hundred or multiples thereof designate modified elements that are understood to incorporate the same features and benefits of the corresponding elements.

In this example, the sublimator 22 is within a space structure 150. The space structure 150 is generally operable in outer space. Examples of the space structure 150 may include, but are not limited to, space vehicles, spacecraft, and spacesuits. The space structure 150 includes a heat source 152 connected with a fluid loop 154 for conveying a working fluid through the heat source 152 to regulate temperature. Most typically the working fluid will be water, but other working fluids could alternatively be used. The heat source 152 may be, but is not limited to, a hardware component in the space structure that generates heat or a garment that collects heat from a wearer of the garment.

The sublimator 22 is connected with the fluid loop 154 to receive the working fluid there though. Thermal energy from the working fluid in the fluid loop is transferred through the heat conduction member 29 and removed by the sublimation process discussed above.

Figure 4:
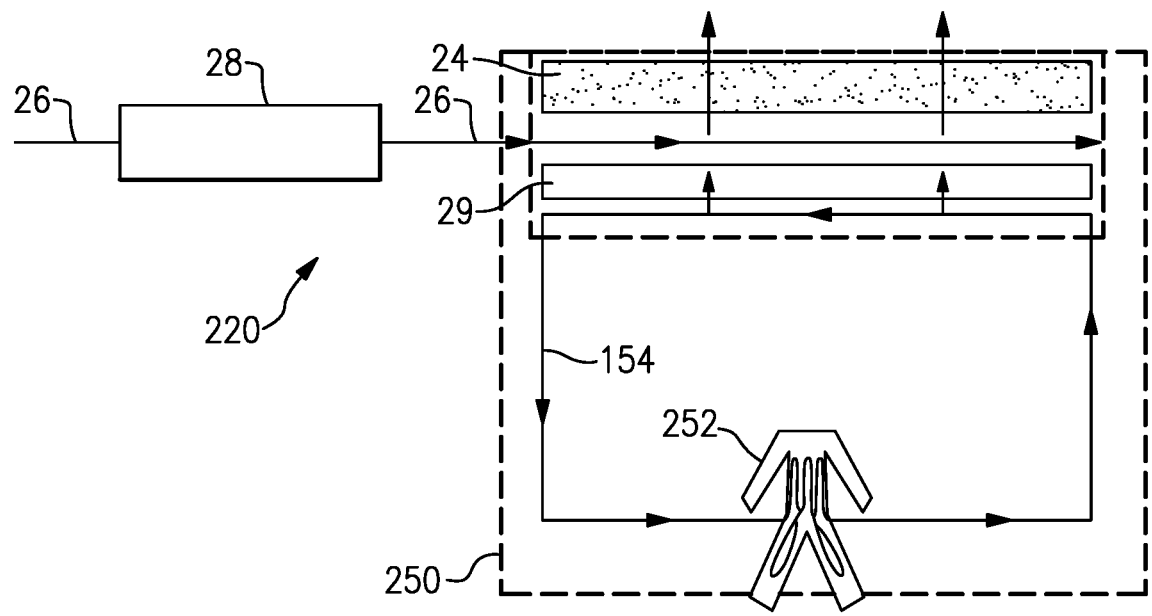
FIG. 4 illustrates another example thermal management system that involves a spacesuit and a garment.

FIG. 4 illustrates another example thermal management system 220. This example is similar to the system 120 except that the sublimator 22 is within a spacesuit 250 and a garment 252 in the spacesuit 250 is the heat source. One example of the spacesuit 250 is the Extravehicular Mobility Unit, which includes an outer garment, also known as a Thermal Micro-meteoroid Garment, a portable life support system, and a pressure garment. The pressure garment provides, among other things, thermal management of the astronaut wearing the spacesuit. This pressure garment may be the garment 252 connected in the fluid loop 154.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A thermal management system comprising:
   a sublimator having a porous plate;
   a water feed line connected with the sublimator for delivering feed water to the porous plate, wherein the sublimator is operable to freeze and sublime the feed water using the porous plate; and
   an adsorbent bed in the water feed line, the adsorbent bed configured to remove organic compounds from the feed water that are capable of forming an adherent layer on the porous plate, wherein the adsorbent bed includes first and second adsorbent media, and wherein the first adsorbent media is synthetic activated carbon and the second adsorbent media is natural activated carbon.

2. The thermal management system as recited in claim 1, wherein the organic compounds include one or more of abietic acid, sodium dodecyl benzene sulfonate (SDBS), acrylic acid oligomers, or n-butyl benzene sulfonamide (NBBS).

3. The thermal management system as recited in claim 1, wherein the first and second adsorbent media are different with regard to adsorption capability of at least two of abietic acid, sodium dodecyl benzene sulfonate (SDBS), acrylic acid oligomers, or n-butyl benzene sulfonamide (NBBS).

4. The thermal management system as recited in claim 1, wherein the adsorbent bed includes, by volume of a total amount of the first and second adsorbent media, from 40% to 60% of the first adsorbent media and from 60% to 40% of the second adsorbent media.

5. The thermal management system as recited in claim 1, wherein the adsorbent bed includes an influent side and an effluent side with regard to the delivery of the feed water to the sublimator, and wherein the first adsorbent media is on the influent side and the second adsorbent media is on the effluent side.

6. The thermal management system as recited in claim 1, wherein the sublimator is in a spacesuit.

7. The thermal management system as recited in claim 1, wherein the adsorbent bed is configured to remove at least 50% of the organic compounds in a single pass.

8. The thermal management system as recited in claim 1, wherein the feed water contains at least 2 parts-per-million of organic carbon, and the adsorbent bed is configured to remove at least 75% of the organic carbon.

9. A thermal management system comprising:
a space structure including a heat source connected with a fluid loop for conveying a working fluid through the heat source to regulate temperature and a sublimator connected with the fluid loop to receive the working fluid, the sublimator having a porous plate;
a water feed line connected with the sublimator for delivering feed water to the porous plate, wherein the sublimator is operable to cool the working fluid by freezing and subliming the feed water using the porous plate; and
an adsorbent bed in the water feed line, the adsorbent bed configured to remove organic compounds from the feed water that are capable of forming an adherent layer on the porous plate, wherein the adsorbent bed includes first and second adsorbent media, and wherein the first adsorbent media is synthetic activated carbon and the second adsorbent media is natural activated carbon.

10. The thermal management system as recited in claim 9, wherein the organic compounds include one or more of abietic acid, sodium dodecyl benzene sulfonate (SDBS), acrylic acid oligomers, or n-butyl benzene sulfonamide (NBBS).

11. The thermal management system as recited in claim 9, wherein the first and second adsorbent media are different with regard to adsorption capability of at least two of abietic acid, sodium dodecyl benzene sulfonate (SDBS), acrylic acid oligomers, or n-butyl benzene sulfonamide (NBBS).

12. The thermal management system as recited in claim 9, wherein the adsorbent bed includes, by volume of a total amount of the first and second adsorbent media, from 40% to 60% of the first adsorbent media and from 60% to 40% of the second adsorbent media.

13. The thermal management system as recited in claim 9, wherein the adsorbent bed includes an influent side and an effluent side with regard to the delivery of the feed water to the sublimator, and wherein the first adsorbent media is on the influent side and the second adsorbent media is on the effluent side.

14. The thermal management system as recited in claim 9, wherein the space structure is a spacesuit.

15. A thermal management system comprising:
a spacesuit including a garment connected with a water loop for conveying coolant water through the garment to regulate temperature and a sublimator connected with the water loop to receive the coolant water, the sublimator having a porous plate;
a water feed line connected with the sublimator for delivering feed water to the porous plate, wherein the sublimator is operable to cool the coolant water by freezing and subliming the feed water using the porous plate; and
an adsorbent bed in the water feed line, the adsorbent bed configured to remove organic compounds from the feed water that are capable of forming an adherent layer on the porous plate, wherein the adsorbent bed includes first and second adsorbent media, and wherein the first adsorbent media is synthetic activated carbon and the second adsorbent media is natural activated carbon.

16. The thermal management system as recited in claim 15, wherein the first and second adsorbent media are different with regard to adsorption capability of at least two of abietic acid, sodium dodecyl benzene sulfonate (SDBS), acrylic acid oligomers, or n-butyl benzene sulfonamide (NBBS), and the adsorbent bed includes, by volume of a total amount of the first and second adsorbent media, from 40% to 60% of the first adsorbent media and from 60% to 40% of the second adsorbent media.

17. The thermal management system as recited in claim 15, wherein the adsorbent bed includes an influent side and an effluent side with regard to the delivery of the feed water to the sublimator, and wherein the first adsorbent media is on the influent side and the second adsorbent media is on the effluent side.

* * * * *